United States Patent
Mahoney et al.

[11] Patent Number: 5,991,761
[45] Date of Patent: Nov. 23, 1999

[54] METHOD OF REORGANIZING A DATA ENTRY DATABASE

[75] Inventors: John F. Mahoney, Sugarland; Ken L. Reid, Waller, both of Tex.

[73] Assignee: BMC Software, Inc., Houston, Tex.

[21] Appl. No.: 08/781,641

[22] Filed: Jan. 10, 1997

[51] Int. Cl.$^6$ .................................................. G06F 17/30
[52] U.S. Cl. ............................................................ 707/100
[58] Field of Search ................................ 707/100, 103, 707/102; 395/200.58

[56] References Cited

U.S. PATENT DOCUMENTS

| | | | |
|---|---|---|---|
| 4,104,718 | 8/1978 | Poublan et al. ........................ | 364/200 |
| 4,918,595 | 4/1990 | Kahn et al. ............................ | 364/200 |
| 4,939,668 | 7/1990 | Brown et al. .......................... | 706/59 |
| 4,939,689 | 7/1990 | Davis et al. ........................... | 707/102 |
| 4,942,540 | 7/1990 | Black et al. ........................ | 395/200.58 |
| 5,265,206 | 11/1993 | Shackelford et al. ................. | 395/200 |
| 5,481,707 | 1/1996 | Murphy, Jr. et al. .................. | 395/650 |
| 5,664,183 | 9/1997 | Cirulli et al. ........................... | 707/103 |
| 5,675,637 | 10/1997 | Szlam et al. .......................... | 379/142 |
| 5,745,901 | 4/1998 | Entner et al. .......................... | 707/103 |
| 5,765,160 | 6/1998 | Yamaguchi ........................... | 707/103 |
| 5,790,789 | 8/1998 | Suarez .................................. | 395/200 |

OTHER PUBLICATIONS

IBM International Systems Center, Guide to IMS/VS VI R3 Data Entry Data Base (DEDB) Facility, IBM Document Number GG24–1633–0) p. 48 (1984).

*Primary Examiner*—Wayne Amsbury
*Assistant Examiner*—Cheryl Lewis
*Attorney, Agent, or Firm*—Arnold White & Durkee

[57] ABSTRACT

The invention relates to a method of reorganizing certain units-of-work in a data entry database. First, a unit-of-work performance parameter is determined for each of a plurality of units-of-work. Next, if and only if the performance parameter of a unit-of-work meets a predetermined criteria, then the unit-of-work is reorganized.

17 Claims, 4 Drawing Sheets

Determine if at least one independent overflow control interval is allocated to a unit-of-work.

Reorganize the unit-of-work if and only if at least one independent overflow control interval is allocated to the unit-of-work.

METHOD OF REORGANIZING A DATA ENTRY DATABASE

1.0 BACKGROUND OF THE INVENTION

The invention relates to a method of reorganizing a data entry database. More particularly, the invention relates to a method of reorganizing selective units-of-work in a data entry database.

1.1 IMS

IMS is one of the oldest and most widely used database systems. It runs under the MVS operating system on large IBM 370 and 370-like machines. IMS is based on the hierarchical data model (discussed below). Queries on the IMS databases are issued through embedded calls in a host language. The embedded calls are part of the IMS database language DL/I.

Because performance is critically important in large databases, IMS allows the database designer a large number of options in the data definition language. The database designer defines a physical hierarchy as the database scheme. Several subschemes may be defined by constructing a logical hierarchy from the record types comprising the scheme. There are a variety of options available in the data definition language (block sizes, special pointer fields, etc.) that allow the database administrator to "tune" the system for improved performance.

1.2 Hierarchical Databases

A hierarchical database consists of a collection of records that are connected to each other with links. Each record is a collection of fields (attributes), each of which contains only one data value. A link is an association between precisely two records. For example, consider the database representing a customer-account relationship in a banking system that is shown in FIG. 1. There are two record types: customer and account. The customer record consists of three fields: name, street, and city. Similarly, the account record consists of two fields: number and balance.

The set of all customers and account records is organized in the form of a rooted tree where the root of the tree is a dummy node. A hierarchical database is a collection of such rooted trees.

1.3 Data Entry Database

One well known IMS hierarchical database is the data entry database (DEDB). As shown in FIG. 2, a DEDB is a collection of a number of database records stored in a set of partitions called Areas. An Area contains a range of DEDB records. As shown in FIG. 3, an Area is divided into three parts: a root addressable part, an independent overflow part, and a sequential dependent part.

1.3.1 Root Addressable Part of an Area

As shown in FIG. 3, the root addressable part of an Area contains units-of-work (UOWs). A UOW consists of a user-specified number of physically contiguous control intervals. A control interval is the unit of transfer between a disk drive storing the DEDB and a computer. When a DEDB is created, the database administrator sets the size of the control intervals for the DEDB. For example, a 4k byte control interval may store up to 3976 bytes of data. (The remaining 120 bytes in the 4k byte control interval define various parameters of the control interval.) Empty data storage elements within a control interval are known as free space elements. The minimum length of a free space element is 4 bytes. Thus, in certain circumstances, storage locations in a control interval are not large enough for a free space element. These storage locations will not be utilized to store data. Such unutilizable storage locations are known in the art as scrap.

A UOW is divided into a base section and an overflow section. The base section contains control intervals that are used for the storage of data. The overflow section of a UOW is used to store data after the base section control intervals of the UOW are fall, ie., unable to satisfy a request for space.

1.3.2 Independent Overflow Part of an Area

As shown in FIG. 3, the independent overflow part of an Area also contains control intervals. These control intervals may be used to extend a particular UOW. Thus, the independent overflow control intervals are logical extensions of the overflow section of a particular UOW. However, once a control interval has been used to extend the overflow section of a particular UOW, only data associated with that UOW may be stored therein. Thus, an independent overflow control interval that is allocated to a particular UOW may be considered to be "owned" by that UOW.

The first control interval in the independent overflow data part contains a space map. This space map indicates which UOW owns the first 120 control intervals in the independent overflow part. There is another space map for every 120 independent overflow control intervals., ie., the 1st, 121st, 241st, etc. control interval in the independent overflow part is a space map control interval.

1.3.3 Sequential Dependent Part of an Area

The sequential dependent part of an Area contains space for storing data in a time-ordered sequence without regard to the UOW containing the root segment. The sequential dependent part is used as a circular buffer for data storage.

1.4 Data Storage in a DEDB

When data is stored in a DEDB, the data is associated with a particular UOW. Initially, the UOW's basic section control intervals will be empty. Thus, the UOW will contain base section control intervals that may be used to store the data. However, as more data is associated with a particular UOW, the base section control intervals will become full.

If additional data is to be associated with a UOW that contains full base section control intervals, then the first control interval within the overflow section of the associated UOW is utilized to store the data. If the first control interval is also full, then the second control interval within the overflow section will be utilized to store the data. Additional data may be similarly associated with the UOW until all control intervals within the overflow section are full.

If additional data is to be associated with a UOW and no space can be found in a UOW's overflow section, then a space map control interval in the independent overflow part of the Area will be allocated to the UOW. This allocation provides the UOW with 119 additional control intervals for data storage. After these additional control intervals are full, another space map control interval will be allocated to the UOW. This sequence continues until no unallocated space map control intervals are available. When this occurs, an error is generated.

1.5 Reorganization of a DEDB

As data is added, updated, and deleted, a DEDB becomes physically disorganized, decreasing operating efficiency. More I/O operations are needed to retrieve data stored in the DEDB. When this occurs, DEDB response time slows. Such a physically disorganized DEDB is known as a fragmented DEDB.

However, by grouping the data associated with each UOW, the data can be accessed more quickly. Thus, the performance of the DEDB is increased. In addition, because related data is grouped together, it is possible to reclaim formally unusable space on a disk drive.

1.6 Conventional Methods of Reorganizing a DEDB

Conventional methods of reorganizing a DEDB reorganize the root addressable and the independent overflow parts of an Area. The sequential dependent part of an Area is not affected. Conventional reorganization of a DEDB reorganizes one UOW at a time.

1.6.1 Conventional On-line-UOW Reorganization Method

One conventional UOW reorganization method progressively copies control intervals that are associated with a particular UOW to a "reorganization UOW." The control intervals typically include basic section control intervals, overflow section control intervals, and independent overflow control intervals. After all control intervals that are associated with a UOW are copied into the reorganization UOW, the reorganization UOW is copied over the original UOW. Then, independent overflow control intervals that are no longer needed by the original UOW are released. Thus, the released control intervals may be allocated to other UOWs. This method of reorganizing a UOW is known as an on-line-UOW reorganization method.

The above described method may be repeated for other UOWs. An example of such a conventional DEDB reorganization method is discussed in *Guide to IMS/VS V1 R3 Data Entry Data Base (DEDB) Facility*, IBM International Systems Center, p. 48, (May 14, 1984) (IBM Document Number GG24-1633-0).

1.6.2 Conventional Off-line-UOW Reorganization Method

One conventional off-line-UOW reorganization method progressively copies control intervals that are associated with UOWs to a sequential file, such as a tape. This procedure is known as unloading a UOW. Next, data contained in the sequential file is loaded back onto a randomly accessible disk drive. Such a method requires very high I/O activity and is very time consuming. Typically, all UOWs in a DEDB are unloaded and then loaded.

1.7 Deficiencies in the Prior Art

As the size and complexity of a DEDB increases, reorganization processing time increases. However, typically the task of reorganization of a DEDB is performed during off-peak hours by executing a batch job. Because of the shrining time window for ring such batch jobs due to the need to provide near continuous DEDB access, there is a need to perform DEDB reorganization as quickly as possible. Conventional DEDB reorganization methods are neither rapid nor efficient. Thus, there is a need for a method that rapidly and efficiently reorganizes a DEDB.

2.0 SUMMARY OF THE INVENTION

The invention relates to a method of reorganizing certain units-of-work in a data entry database. First, a unit-of-work performance parameter is determined for each of a plurality of units-of-work. Next, if and only if the performance parameter of a unit-of-work meets a predetermined criteria, then the unit-of-work is reorganized.

3.0 BRIEF DESCRIPTION OF THE DRAWINGS

4.0 DETAILED DESCRIPTION OF ILLUSTRATIVE EMBODIMENTS

An illustrative embodiment of a method in accordance with the invention is described below. In the interest of clarity, not all features of actual implementations are necessarily described in this specification. It will be appreciated that in the development of any such actual implementation, as in any such project, numerous programming decisions must be made to achieve the developers' specific goals and subgoals (e.g., compliance with system- and business-related constraints), which will vary from one implementation to another. Moreover, attention must, of course, be paid to proper programming practices for the environment in question. It will be appreciated that such a development effort might be complex and time-consuming, but would nevertheless be a routine undertaking for those of ordinary skill having the benefit of this disclosure.

It is often said that 80% of database activity is directed to 20% of database space. Thus, typically during a reorganization of a DEDB, only 20% of the UOWs need to be reorganized and the other 80% of the UOWs do not need to be reorganized. By determining if a performance parameter of a particular UOW meets a predetermined criteria, it is possible to determine which UOWs would benefit from reorganization. By reorganizing a UOW if and only if the performance parameter of that UOW meets the predetermined criteria, then the DEDB will be rapidly and efficiently reorganized.

Figure 1:
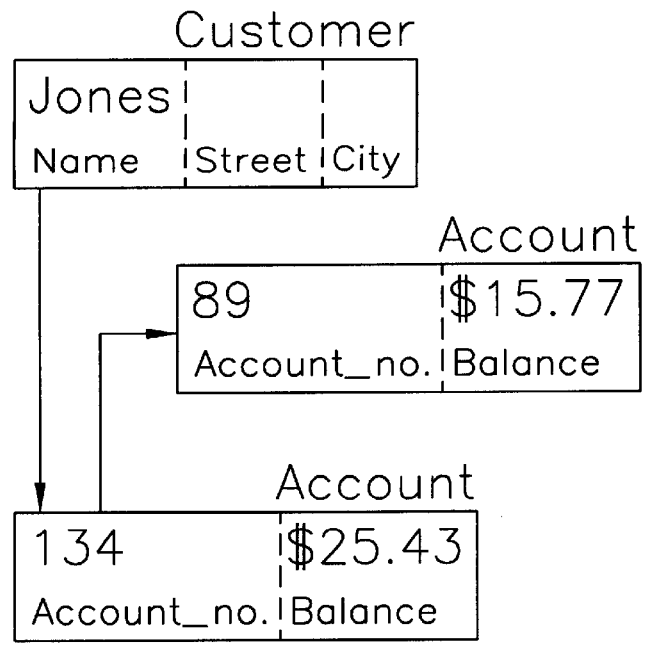
FIG. 1 is a diagram of a hierarchical database.
Figure 2:
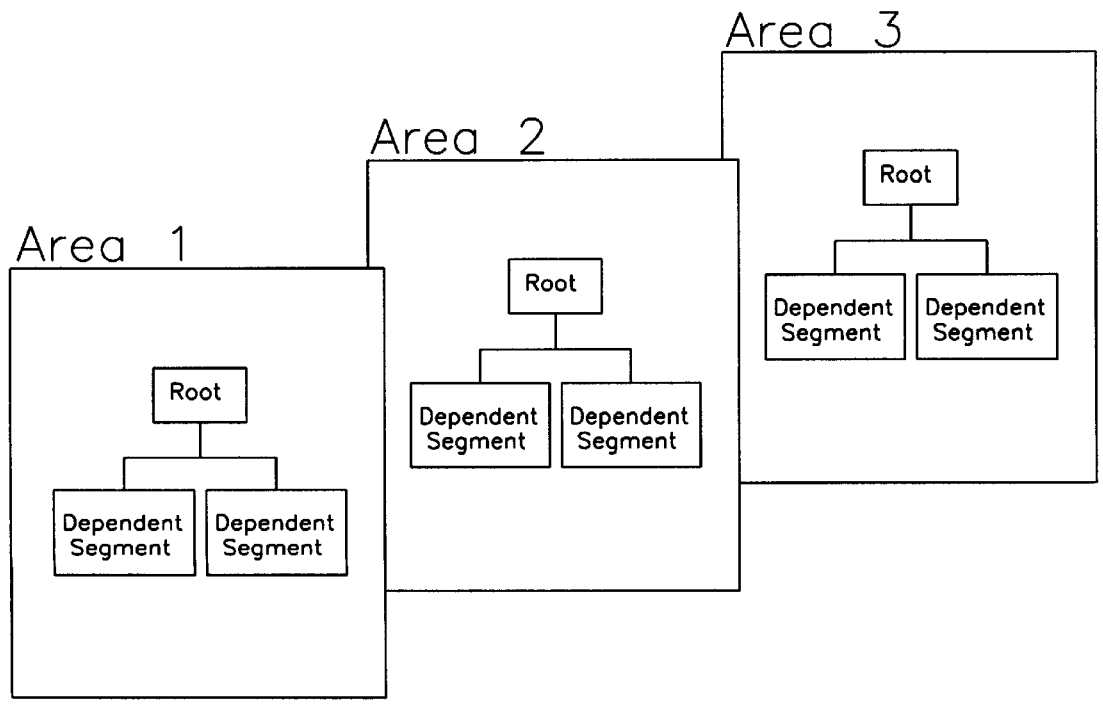
FIG. 2 is a diagram of a data entry database.
Figure 3:
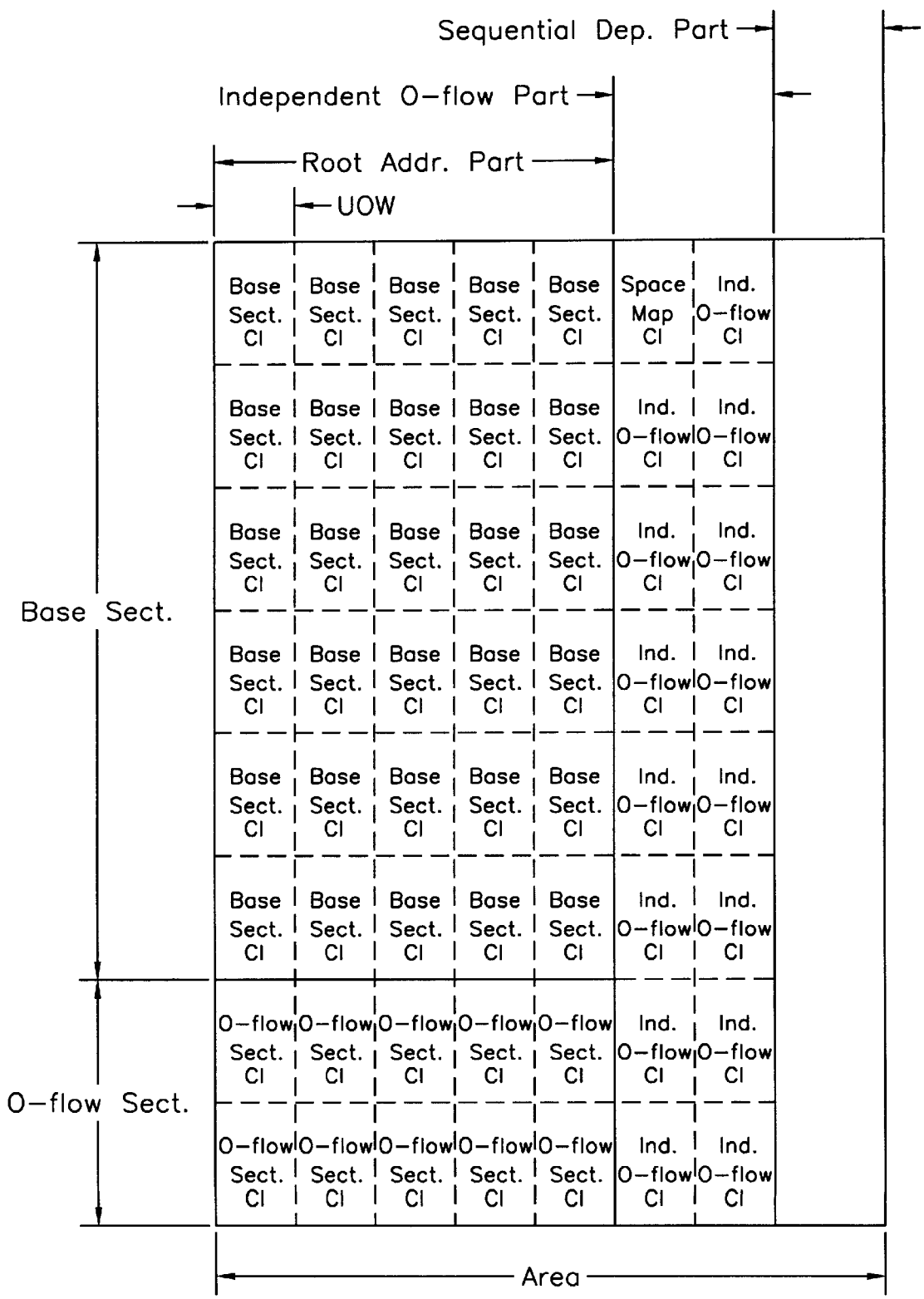
FIG. 3 is a diagram of an Area in a data entry database.
Figure 4:
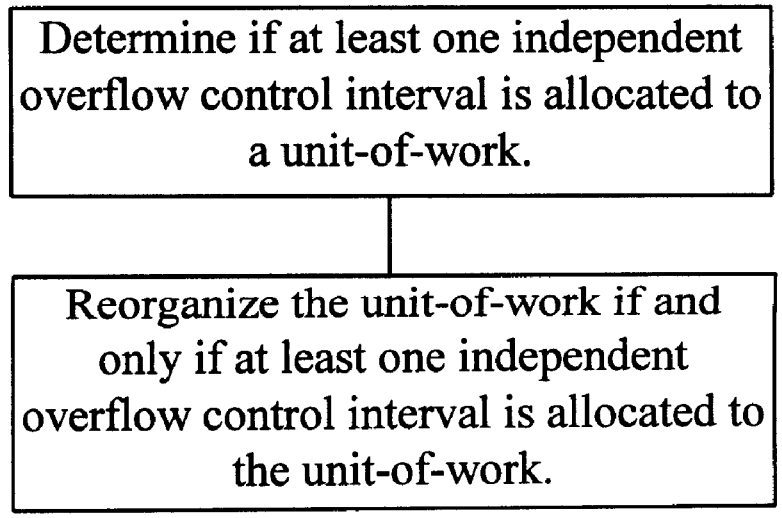
FIG. 4 is a flow chart of one embodiment of the invention.

4.1 Reorganizing UOWs If and Only If They Have an Independent Overflow Control Interval In one embodiment, UOWs are reorganized if and only if they have at least one allocated independent overflow control interval. FIG. 4 presents a flow chart for a method that reorganizes UOWs if and only if they have at least one allocated independent overflow control interval.

As shown in FIG. 4, first it is determined, for each UOW in the DEDB, if the UOW has at least one allocated independent overflow control interval. If an independent control interval is allocated to a UOW, then it is likely that the UOW will benefit from reorganization. Next, if and only if the UOW has at least one allocated independent overflow control interval, then the UOW is reorganized.

While in certain circumstances, the above method is performed on all UOWs in a DEDB, in other embodiments, the method may be performed to only a subset of the UOWs in a DEDB. By applying the above method to a limited number of UOWs, reorganization of a subset of a DEDB may be performed in a limited amount of time.

Figure 5:
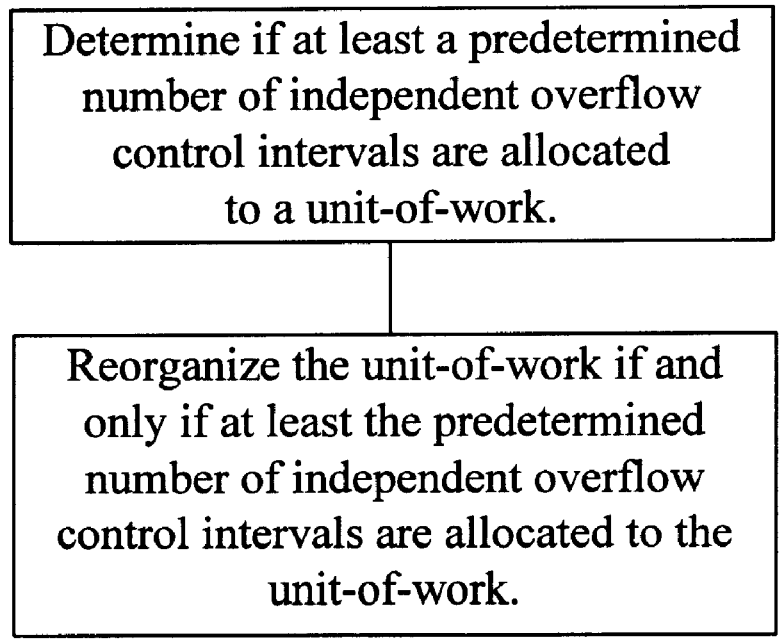
FIG. 5 is a flow chart of a second embodiment of the invention.

4.2 Reorganizing UOWs If and Only If They Have a Predetermined Number of Independent Overflow Control Intervals In certain circumstances, only UOWs that have at least a predetermined number of allocated independent overflow control intervals are reorganized. FIG. 5 presents a flow chart for a method that reorganizes such UOWs.

As shown in FIG. 5, first it is determined, for each UOW, if the UOW has at least a predetermined number of allocated independent overflow control intervals. In certain circumstances, the predetermined number will be 2, 3, 4, or 5 independent overflow control intervals. Next, if and only if the UOW has at least the predetermined 11 number of allocated independent overflow control intervals, then the UOW is reorganized. The method shown in FIG. 5 may be performed on all UOWs in a DEDB or just a subset of the UOWs in a DEDB.

4.3 Reorganizing UOWs If and Only If They Have a Fragmentation Percentage Greater than a Predetermined Fragmentation Percentage In another embodiment, only UOWs that have at least a predetermined fragmentation percentage are reorganized. The fragmentation percentage of a UOW is a measure of the fragmentation of a UOW. Such a fragmentation percentage may be calculated by any of numerous equations that provide an indication of the number of scattered free space elements and scraps in a DEDB. One equation for calculating the fragmentation percentage of a DEDB follows:

$$\text{Fragmentation \%} = \frac{\text{free space} \times (\text{num. of free space elements and scraps})}{\text{size of control interval}}$$
$$\text{size of control interval} / 1600$$

Where: free space=the total free space of the DEDB (in bytes);

num. of free space elements and scraps=the number of free space elements plus the number of scraps;

size of control interval=the size of control intervals set by the database administrator (in bytes).

Figure 6:
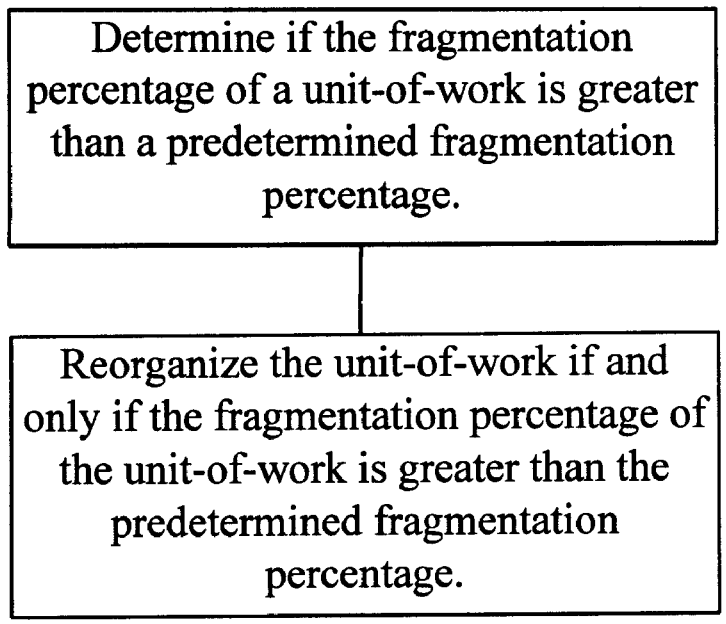
FIG. 6 is a flow chart of a third embodiment of the invention.

FIG. 6 presents a flow chart for a method that reorganizes UOWs that have a fragmentation percentage greater than a predetermined fragmentation percentage.

As shown in FIG. 6, first it is determined, for each UOW, if the UOW has a fragmentation percentage greater than a predetermined fragmentation percentage. In certain circumstances, the predetermined fragmentation percentage will be 2, 3, 4, or 5 percent. Next, if and only if the UOW has a fragmentation percentage greater than the predetermined fragmentation percentage, then the UOW is reorganized. The method shown in FIG. 6 may be performed on all UOWs in a DEDB or just a subset of the UOWs in a DEDB.

Figure 7:
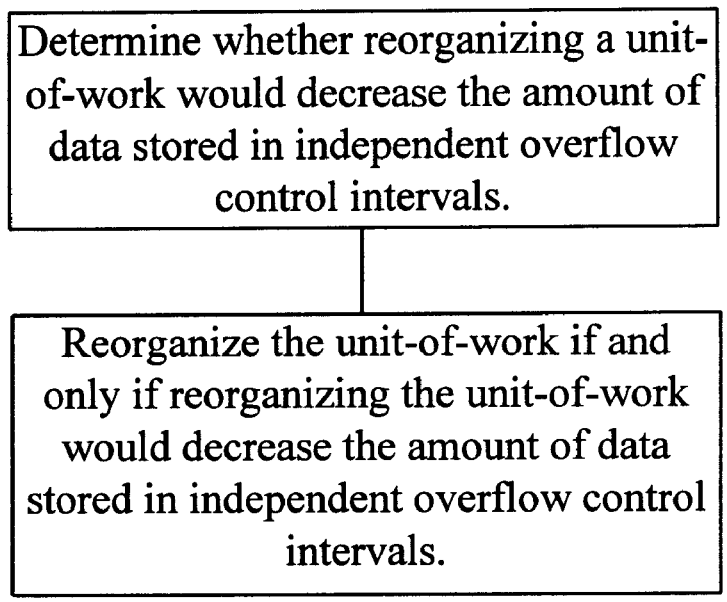
FIG. 7 is a flow chart of a fourth embodiment of the invention.

4.4 Reorganizing UOWs If and Only If Reorganization will Decrease Independent Overflow Control Intervals FIG. 7 presents a flow chart for still another method for reorganizing certain UOWs. As shown in FIG. 7, first it is determined, for each UOW, whether reorganizing the UOW would decrease the amount of data stored in independent overflow control intervals. Methods for making such a determination are known by those skilled in the art. Next, if and only if reorganizing the UOW would decrease the amount of data stored in independent overflow control intervals, then the UOW is reorganized. The method shown in FIG. 7 may be performed on all UOWs in a DEDB or just a subset of the UOWs in a DEDB.

4.5 Alternative Embodiments

Discussed above are embodiments of the invention that utilize different performance parameters of UOWs to select UOWs that would benefit from reorganization. Such performance parameters include: whether a UOW has an allocated independent overflow control interval; whether a UOW has at least a predetermined number of allocated independent overflow control intervals; whether a UOW has a fragmentation percentage greater than a predetermined fragmentation percentage; and whether reorganization of a UOW would decrease the amount of data stored in independent overflow control intervals. The above performance parameters are not intended to be exhaustive. While the above performance parameters are likely to be optimal for the vast majority of circumstances, it is possible that additional performance parameters may be useful for selecting UOWs that would benefit from reorganization.

In addition, it is possible that boolean combinations of performance parameters may also be useful for making such a UOW selection. The term performance parameter is intended to include boolean combinations of other performance parameters.

4.6 Program Storage Device

Any of the foregoing embodiments may be implemented by programming a suitable general-purpose machine having appropriate hardware. The machine may comprise a single computer. Alternatively, the machine may comprise a plurality of computers connected by a communications link such as an RS-232 link or a network; the computers may be linked in, e.g., a parallel-processing arrangement or a client-server arrangement.

The programming may be accomplished through the use of a program storage device readable by the machine and encoding a program of instructions executable by the machine for performing the operations described above. The program storage device may take the form of, e.g., one or more floppy disks; a hard disk; a CD ROM or other optical disk; a magnetic tape; a read-only memory chip (ROM); and other forms of the kind well-known in the art or subsequently developed. The program of instructions may be "object code," ie., in binary form that is executable more-or-less directly by the computer; in "source code" that requires compilation or interpretation before execution; or in some intermediate form such as partially compiled code. The precise forms of the program storage device and of the encoding of instructions is immaterial.

4.7 Remarks

A primary advantage of the DEDB reorganization methods discussed above is that they are enormously efficient and rapid because they reorganize only UOWs that will benefit from reorganization. In addition, such methods allow a database administrator to fine-tune reorganization. For example, an administrator may reorganize UOWs based on one or more UOW performance parameters.

Another advantage is that discussed DEDB reorganization methods may be performed during off-peak time periods by executing a batch job. Because the reorganization methods are rapid, DEDB access may be maximized.

A further advantage is that the discussed DEDB reorganization methods may utilize either conventional on-line-UOW reorganization methods or conventional off-line-UOW reorganization methods.

Still another advantage of the discussed DEDB reorganization methods, is that log records may be minimized when performing off-line reorganizations. During off-line reorganizations, log records are often created. These log records provide an audit trail of the reorganization. A complete reorganization of a DEDB will create a very large number of log records. However, a selective reorganization of the same DEDB utilizing UOW performance parameters to select UOWs will create fewer log records.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method of reorganizing certain units-of-work in a data entry database, the method comprising:

(a) for each unit-of-work in at least a subset of the units-of-work in the data entry database:

(i) determining a performance parameter of the unit-of-work, and (ii) if and only if the performance parameter of the unit-of-work meets a predetermined criteria, then reorganizing the unit-of-work.

2. The method of claim 1 wherein the step of determining a performance parameter of the unit-of-work includes determining a plurality of performance parameters of the unit-of-work and determining a boolean combination of at least a subset of the plurality of performance parameters of the unit-of-work.

3. A method of reorganizing certain units-of-work in a data entry database, the method comprising:
  (a) for each unit-of-work in at least a subset of the units-of-work in the data entry database:
    (i) determining if at least one independent overflow control interval is allocated to the unit-of-work, and
    (ii) if and only if at least one independent overflow control interval is allocated to the unit-of-work, then reorganizing the unit-of-work.

4. A method of reorganizing certain units-of-work in a data entry database, the method comprising:
  (a) for each unit-of-work in at least a subset of the units-of-work in the data entry database:
    (i) determining if at least a predetermined number of independent overflow control intervals are allocated to the unit-of-work, and
    (ii) if and only if at least the predetermined number of independent overflow control intervals are allocated to the unit-of-work, then reorganizing the unit-of-work.

5. The method of claim 4 wherein the step of determining if at least a predetermined number of independent overflow control intervals are allocated to the unit-of-work includes determining if at least two independent overflow control intervals are allocated to the unit-of-work.

6. The method of claim 4 wherein the step of determining if at least a predetermined number of independent overflow control intervals are allocated to the unit-of-work includes determining if at least three independent overflow control intervals are allocated to the unit-of-work.

7. The method of claim 4 wherein the step of determining if at least a predetermined number of independent overflow control intervals are allocated to the unit-of-work includes determining if at least four independent overflow control intervals are allocated to the unit-of-work.

8. The method of claim 4 wherein the step of determining if at least a predetermined number of independent overflow control intervals are allocated to the unit-of-work includes determining if at least five independent overflow control intervals are allocated to the unit-of-work.

9. A method of reorganizing certain units-of-work in a data entry database, the method comprising:
  (a) for each unit-of-work in at least a subset of the units-of-work in a data entry database:
    (i) determining if the fragmentation percentage of the unit-of-work is greater than a predetermined fragmentation percentage, and
    (b) if and only if the fragmentation percentage of the unit-of-work is greater than the predetermined fragmentation percentage, then reorganizing the unit-of-work.

10. The method of claim 9 wherein the step of determining if the fragmentation percentage of the unit-of-work is greater than the predetermined fragmentation percentage includes determining if the fragmentation percentage of the unit-of-work is greater than 1 percent.

11. The method of claim 9 wherein the step of determining if the fragmentation percentage of the unit-of-work is greater than the predetermined fragmentation percentage includes determining if the fragmentation percentage of the unit-of-work is greater than 2 percent.

12. The method of claim 9 wherein the step of determining if the fragmentation percentage of the unit-of-work is greater than the predetermined fragmentation percentage includes determining if the fragmentation percentage of the unit-of-work is greater than 3 percent.

13. The method of claim 9 wherein the step of determining if the fragmentation percentage of the unit-of-work is greater than the predetermined fragmentation percentage includes determining if the fragmentation percentage of the unit-of-work is greater than 4 percent.

14. The method of claim 9 wherein the step of determining if the fragmentation percentage of the unit-of-work is greater than the predetermined fragmentation percentage includes determining if the fragmentation percentage of the unit-of-work is greater than 5 percent.

15. A method of reorganizing certain units-of-work in a data entry database, the method comprising:
  (a) for each unit-of-work in at least a subset of the units-or-work in the data entry database:
    (i) determining whether reorganizing the unit-of-work would decrease the amount of data stored in independent overflow control intervals, and
    (ii) if and only if reorganizing the unit-of-work would decrease the amount of data stored in independent overflow control intervals, then reorganizing the unit-of-work.

16. A program storage device readable by a machine and containing instructions for performing the method contained in a specified one of claims 1 through 15.

17. A data entry database produced by performing the method contained in a specified one of claims 1 through 15.

* * * * *